United States Patent [19]

Remedi

[11] Patent Number: 4,758,945
[45] Date of Patent: Jul. 19, 1988

[54] METHOD FOR REDUCING POWER CONSUMED BY A STATIC MICROPROCESSOR

[75] Inventor: James J. Remedi, Austin, Tex.

[73] Assignee: Motorola, Inc., Schaumburg, Ill.

[21] Appl. No.: 65,292

[22] Filed: Aug. 9, 1979

[51] Int. Cl.[4] .............................................. G06F 1/04
[52] U.S. Cl. .................................................... 364/200
[58] Field of Search ... 364/200 MS File, 900 MS File; 365/227

[56] References Cited

U.S. PATENT DOCUMENTS

| | | | |
|---|---|---|---|
| 3,411,147 | 11/1968 | Packard | 364/200 |
| 3,535,560 | 10/1970 | Cliff | 364/200 |
| 3,736,569 | 5/1973 | Bouricius et al. | 364/200 |
| 3,855,577 | 12/1974 | Vandierendonck | 364/200 |
| 3,941,989 | 3/1976 | McLaughlin et al. | 235/156 |
| 4,030,079 | 6/1977 | Bennett et al. | 364/200 |
| 4,151,611 | 4/1979 | Sugawara et al. | 365/227 |
| 4,158,230 | 6/1979 | Washizuka et al. | 364/708 |
| 4,191,998 | 3/1980 | Carmody | 364/200 |

*Primary Examiner*—David Y. Eng
*Attorney, Agent, or Firm*—John A. Fisher; Jeffrey Van Myers

[57] ABSTRACT

In response to a software instruction, a static microprocessor is placed in a low current mode by disabling clock pulse generation. Means are provided for disabling a master oscillator when a STOP instruction is decoded. Additional means are provided for inhibiting clock pulses when a WAIT instruction is decoded without disabling the master oscillator. Clock pulse generation is again enabled upon receipt of a reset or interrupt signal.

6 Claims, 3 Drawing Sheets

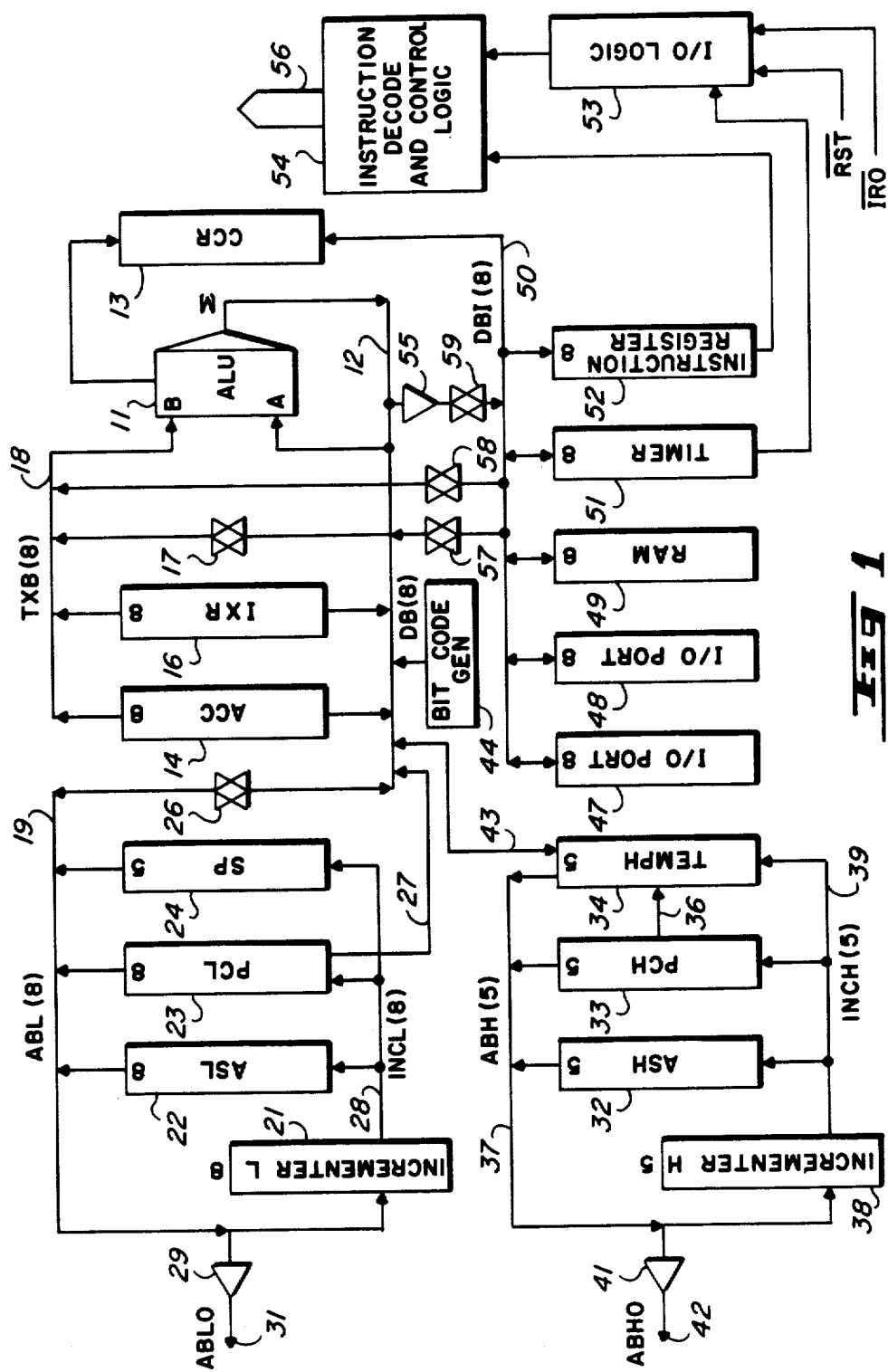

METHOD FOR REDUCING POWER CONSUMED BY A STATIC MICROPROCESSOR

CROSS REFERENCE TO RELATED APPLICATIONS (1) U.S. patent application Ser. No. 065,293 filed of even date herewith entitled "Apparatus for Reducing Power Consumed by a Static Microprocessor" and assigned to the assignee of the present invention.

(2) U.S. patent application Ser. No. 065,294 filed of even date herewith entitled "CMOS Microprocessor Architecture" and assigned to the assignee of the present invention.

BACKGROUND OF THE INVENTION

1. Field of the Invention

This invention relates generally to microcomputers and, more particularly, to a method for reducing the power consumed by static microprocessors.

2. Description of the Prior Art

Microcomputers are sophisticated, general purpose logic devices which can be programmed to perform a wide variety of useful control functions in industrial and communications equipment, large scale and medium scale computer peripheral and terminal hardware, automobiles and other transportation media, amusement and educational devices, household appliances and other consumer goods, and the like. Generally, an entire spectrum of microcomputers is presently available in the commercial marketplace. As the speed of operation increases, the more valuable and more versatile the microcomputer becomes since it is capable of controlling the given operation more efficiently and more accurately, of controlling a greater number of operations simultaneously, and of controlling operations requiring relatively fast response times.

The throughput of any given microcomputer is a function of, among other things, the number of machine cycles required to execute a given set of instructions. In the course of designing any computer system, and in particular a microcomputer, a set of instructions is selected which will provide the anticipated program requirements for the projected market in which the computer system is to be used. The microprocessor, or processor component of a single chip microcomputer, executes each instruction as a sequence of machine cycles, with the more complex instructions consuming a greater number of machine cycles.

The operation of the internal circuitry of the microprocessor is synchronized by means of a master clock signal applied to the microprocessor. The master clock signal may actually comprise two or even four clock components; i.e., the microprocessor clock may be two phase or four phase. During the basic clock cycle known as the machine cycle, a number of internal processor related operations may take place simultaneously including the transfer of digital information from a bus to a register or vice versa, between certain registers, from an address or data buffer to a bus or vice versa, and so forth. Additionally, the individual conductors of a bus may each be set to a predetermined logic level, or the contents of a register may be set to a predetermined logic level.

It is also desirable, particularly with respect to microcomputers intended for marketing in the middle to low end of the price scale, to minimize the computer chip size as much as possible.

Static microprocessors implemented with complementary MOS technology (CMOS) exhibits low DC current drain. Such systems are thus considered to consume less power and little power when operating. To further reduce power consumption, one known system utilizes a HALT instruction which inhibits processor execution. However, all clock signals utilized by the processor continue to be generated. Since a static microprocessor will maintain its state even in the absence of clock signals, it would be desirable to provide a method for disabling clock signals in an intelligent manner until further processor operations become necessary.

SUMMARY OF THE INVENTION

It is an object of the present invention to provide a method for reducing the power consumed by a static microprocessor.

It is a further object of the present invention to reduce power consumed by static microprocessor by utilizing software instructions which place the microprocessor in a very low current state.

It is yet another object of the present invention to provide a method for reducing power consumed by a CMOS static microprocessor by inhibiting the clock pulses generated until processor operation is required as indicated by some external stimulus.

According to a broad aspect of the invention there is provided a method for reducing, in response to at least one software instruction, energy consumed by a digital system of the type which includes a master oscillator having at least one signal output for producing a clock signal, said method comprising the steps of: decoding said at least one software instruction; and inhibiting said clock signal in response to said software instruction.

The above and other objects, features and advantages of the present invention will be more clearly understood from the following detailed description taken in conjunction with the accompany drawings; in which:

BRIEF DESCRIPTION OF THE DRAWINGS

FIG. 1 is a block diagram of a microprocessor in which the present invention may be embodied;

DESCRIPTION OF THE PREFERRED EMBODIMENT

Figure 3:
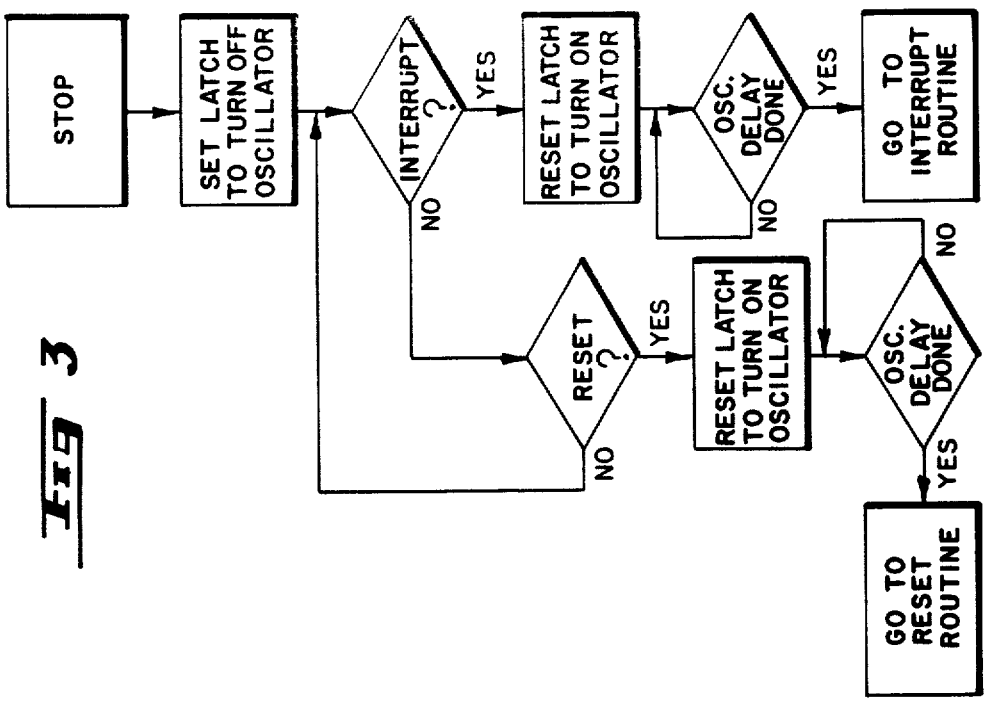
FIG. 3 is a flow diagram illustrating the sequence of operation produced by a STOP instruction in accordance with the present invention.

Referring to FIG. 1, there is shown a block diagram of a microprocessor of a type which may embody the present invention. The microprocessor includes a RAM, timer, and input/output (I/0). The microprocessor has an ALU 11 having an input A, an input B, and a summation output. The summation output is coupled to an 8 bit data bus 12. Data bus 12 couples information to input A. Information is carried to input B by an 8 bit transfer bus 18. An accumulator 14 is coupled to both transfer bus 18 and data bus 12. Accumulator 14 is an 8 bit general purpose register used for arithmetic calculations and data manipulations. An 8 bit index register 16 is coupled between transfer bus 18 and data bus 12. Index register 16 is used during an index mode of addressing and provides an 8 bit address which may be added as an offset to create a new effective address. Index register 16 is also used for calculations and data manipulation during read/modify/write instructions, and as a temporary storage register when not in use for addressing purposes. A transmission gate 17 is used to couple data bus 12 to transfer bus 18. A condition code register 13 is coupled to internal data bus 50 and receives an input from ALU 11. Condition code register 13 is a 5 bit register and contains flags which reflects the results of ALU 11 operations. A first bit contained in condition code register 13 is a carry bit and is set when a carry or a borrow out of ALU 11 occurs during an arithmetic operation. The carry bit can also be modified by certain branch instructions. A second bit in condition code register 13 is a zero bit and is set whenever the result of the last arithmetic, logical, or data manipulation is zero. A third bit is a negative bit which indicates that the result of the last arithmetic, logical, or data manipulation is negative. A fourth bit is a mask interrupt bit and when set, disables both external and timer interrupts. Clearing the interrupt mask bit enables both of the interrupts. Both the timer and external interrupts are latched so that no interrupts are lost because of the interrupt mask bit being set. A fifth bit is a half carry bit, and is set if a carry occurs between bits 3 and 4 of the ALU during an add or an add with carry instruction.

An 8 bit address bus 19 is coupled to data bus 12 by transmission gate 26. Address bus 19 carries the lower 8 bits of an address. The microprocessor of FIG. 1 is capable of addressing up to 8K bytes of external memory with a multiplexed address/data bus. Address bus 19 is coupled to an output buffer 29 and to an incrementer 21. Buffer 29 provides buffered outputs on line 31 which is the 8 bit lower order output address bus. Incrementer 21 is an 8 bit incrementer which can decrement as well as increment. Incrementer 21 is coupled to three registers by line 28. The three registers are an address store register 22, a program counter register 23, and a stack pointer 24. Address store 22 is an 8 bit register which is used to store a lower order effective address such as generated from a branch instruction. Program counter 23 is an 8 bit register which contains the lower 8 bits of a thirteen bit word which is used to point to the next instruction to be executed by the microprocessor. Stack pointer 24 is a 6 bit stack pointer which contains the address of the next free location on a push down/pop up stack. The stack pointer 24 decrements during pushs and increments during pulls. Stack pointer 24 is used to store the location of the return address on subroutine calls and to store the location of the machine state during interrupts. In a preferred embodiment stack pointer 24 is an 8 bit register with the two most significant bits permanently set to a predetermined state.

The outputs of registers 22, 23, and 24 are connected to address bus 19. Program counter 23 also provides an output to data bus 12 via line 27. When one of register 22, 23, or 24 is desired to be modified its contents are transferred by address bus 19 to incrementer 21, where incrementer 21 can increment or decrement the contents, and the contents are then carried by line 28 back to any desired register. This arrangement of incrementer 21 with registers 22, 23 and 24 permit one common incrementer/decrementer for three registers with one of the registers, the program counter 23, also being directly coupled to data bus 12. As mentioned hereinbefore, address bus 19 is coupled to data bus 12 by transmission gate 26.

It should be noted that although the buses are illustrated by one line that they are multiple lines with each different line carrying a different data bit.

The higher five bits of the address word is provided on line 42 by output buffer 41. Output buffer 41 is coupled to a 5 bit address bus 37. It should be noted that in a preferred embodiment, the lower eight bits of the address are multiplexed to external devices while the upper five bits are directly provided on interface pins. Address bus 37 is also coupled to an incrementer/decrementer 38 which is similar to incrementer 21 but only handles five bits. An address store register 32 is coupled from the output of incrementer 38 to address bus 37. Address store 32 contains the high bits of the address while address store 22 contains the lower eight bits of the address. A 5 bit program counter 33 is coupled between the output of incrementer 38 and address bus 37. A 5 bit temporary register 34 is coupled from the output of incrementer 38 to address bus 37. Program counter 33 also provides an output 36 to temporary register 34, which allows the contents of program counter 33 to be directly transferred into temporary register 34. This transfer between registers of course results in faster operation. The output of incrementer 38 is carried by a 5 bit bus or line 39 to registers 32, 33, and 34. Temporary register 34 is directly coupled to data bus 12 by interconnect bus 43. A bit code generator 44 is also connected to data bus 12 which allows any one of the bit lines of data bus 12 to be set or reset under instruction control.

An 8 bit internal data bus 50 is coupled by transmission gate 57 to data bus 12, by a transmission gate 58 to transfer bus 18, and receives information from data bus 12 by buffer/driver 55 and transmission gate 59. Buffer/driver 55 and transmission gate 59 are connected in series. As will be seen hereinafter, the registers are compact, fully static, and are not required to provide static current drive since the drive is provided by buffer 55. By having buffers/drivers 29, 41, and 55 the registers do not require large current drivers and therefore the entire microprocessor can be made smaller in size. An 8 bit I/0 port 47 and an 8 bit I/0 port 48 are coupled to internal data bus 50. I/0 ports 47 and 48 contain data direction registers which control whether the individual interface pins associated with the I/0 ports are serving as an input or an output for the microprocessor. Also coupled to internal data bus 50 is a random access memory (RAM) 49 which stores 8 bit words. In a preferred embodiment, RAM 49 stores 112 bytes. RAM 49 could be used for, among other things, a stack to store the contents of the registers during an interrupt.

Timer 51 is coupled to internal data bus 50 and has a single 8 bit counter with a 7 bit prescaler as its timer. The 8 bit counter is preset under program control and then decrements towards zero. When a zero crossing is detected the timer interrupt request bit of timer 51 is set, then, if a timer interrupt mask and the interrupt mask bit of condition code register 13 are both cleared the microprocessor receives an interrupt. The microprocessor now stores the appropriate registers on the stack, which is located in RAM 49, and then fetches the interrupt address vectors and begins servicing the interrupt. The prescaler of timer 51 is a 7 bit counter used to extend the maximum length of the timer. Timer 51 also provides an output to input/output logic 53. Input/output logic 53 provides an output to instruction decode and control logic 54. Input/output logic 53 receives and processes a reset and an interrupt request input. An 8 bit instruction register 52 is coupled from internal data bus 50 to instruction decode and control logic 54. Control logic 54 provides decoded instruction outputs and the necessary controls on output lines 56. The outputs on line 56 are used throughout the microprocessor to control the functioning and operation of the microprocessor, a few of such being transmission gates 17, 57, 58, and 59 and bit code generator 44. It is possible for the microprocessor to be a microcomputer simply by the addition of a read only memory (ROM) coupled to internal data bus 50.

A detailed description of the microprocessor shown in FIG. 1 can be found in U.S. patent application Ser. No. 065,294 filed of even date herewith entitled "CMOS Microprocessor Architecture" and assigned to the assignee of the present invention.

As stated previously, a static CMOS microprocessor will maintain its state even in the absence of clock signals. Therefore, to reduce the amount of power consumed, it is desirable to inhibit clock pulses when the processor need not be functioning. This, according to the present invention, is accomplished in two ways. First, a WAIT instruction is added to the instruction repertoire. When executed, the master clock oscillator continues to function as does the timer 51 shown in FIG. 1. However, all other internal processor clocks are inhibited. Thus, the WAIT instruction places the processor in a low power state. The processor may be again rendered operational by (1) activating an external reset, or (2) the presence of an interrupt signal.

A second approach to inhibiting the clocks when the processor need not function is to provide a STOP instruction to the instruction repertoire. When a STOP instruction is executed, both the master clock oscillator and the internal clocks are inhibited. The processor is now in a very low current state; i.e., only leakage current is present. The processor is then restarted as a result of an external reset or interrupt signal; however, it is necessary to provide some period of delay to allow the oscillator to become stable.

Figure 2:
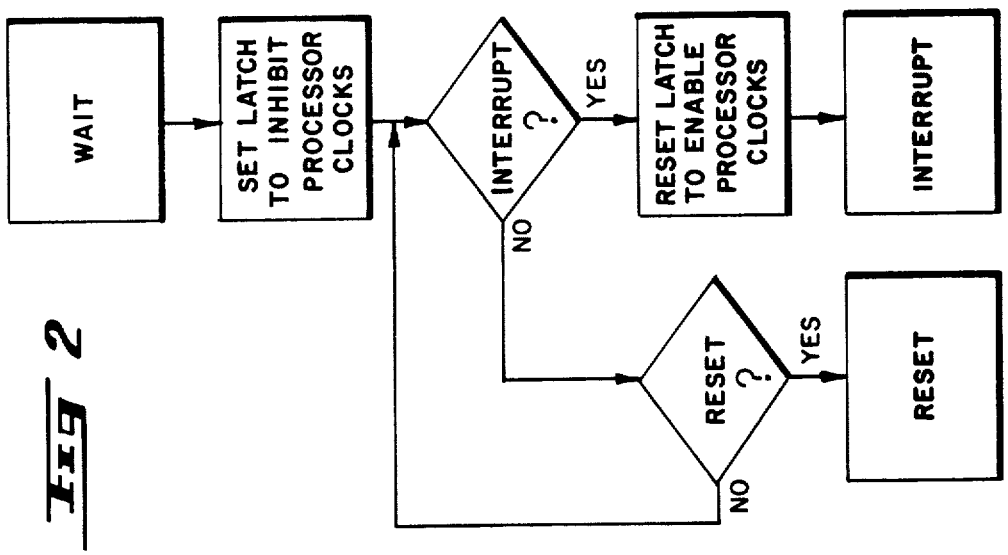
FIG. 2 is a flow diagram illustrating the sequence of operation produced by a WAIT instruction in accordance with the present invention.

FIG. 2 is a flow diagram which illustrates the execution of a WAIT instruction. After a WAIT instruction has been decoded, a latch is set which inhibits the processor clocks. Thus, the processor is placed in a low current mode and awaits either a reset signal or an interrupt signal. If a reset signal is received, the processor will execute a reset routine. If, on the other hand, an interrupt is received, the above referred to latch is reset to enable the processor clocks to commence and an interrupt routine to be executed.

FIG. 3 is a flow diagram illustrating the use of the STOP instruction. After the STOP instruction has been decoded, a second latch is set which turns off the master oscillator. This places the processor in a very low current mode until either a reset or an interrupt signal is received. If an interrupt or a reset signal is received, the second latch is reset to enable the master oscillator. In order to assure that the oscillator is functioning with sufficient logic swing and has settled with respect to frequency, a predetermined amount of delay is provided before the processor executes an interrupt or reset routine.

Figure 4:
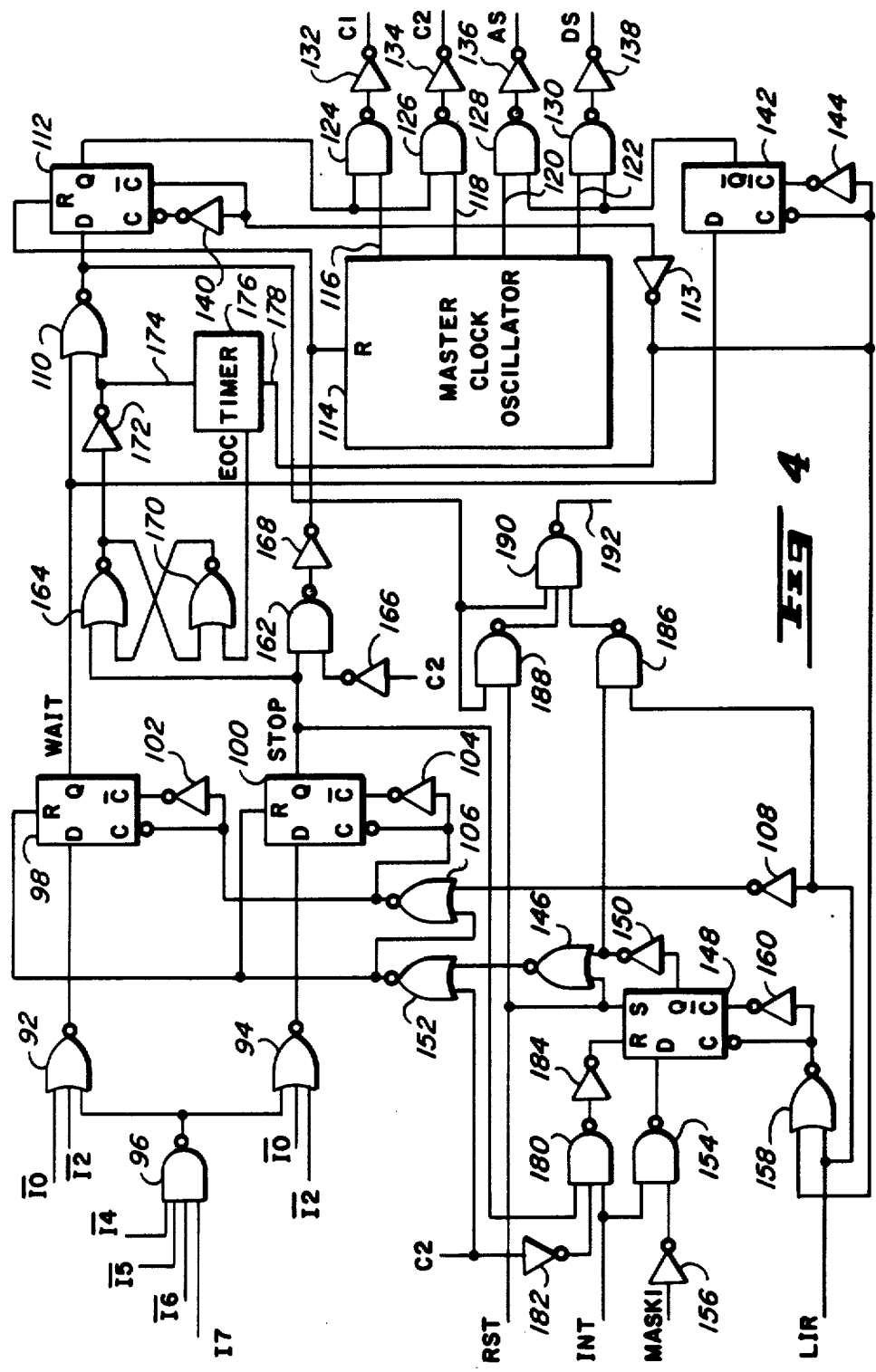
FIG. 4 is a logic diagram illustrating an apparatus for inhibiting clock signal in response to the WAIT or STOP instructions of FIGS. 2 and 3 to reduce power consumption in the processor.

FIG. 4 is a logic diagram illustrating the apparatus for inhibiting the clocks or master clock oscillator in response to a WAIT or STOP instruction respectively. The instruction is decoded in decode and control logic 54 (FIG. 1), and the individual decoded instruction bits or the complements thereof are applied to gates 92, 94 and 96. The output of NOR gate 92 will be high when signals I0, I2, $\overline{I4}$, $\overline{I5}$, $\overline{I6}$ and I7 are at a logical "1" level. The output of NOR gate 94 will be high when signals $\overline{I0}$, $\overline{I2}$, $\overline{I4}$, $\overline{I5}$, $\overline{I6}$ and I7 are at a logical "1" level. A logical "1" at the output of NOR gate 92 will occur when a WAIT instruction has been decoded, and a logical "1" will appear at the output of NOR gate 94 when a STOP instruction has been decoded. D- type flip-flops 98 and 100 are employed to latch the WAIT and STOP commands respectively. Both flip-flops 98 and 100 are clocked by the output of NOR gate 106 which is applied to the C inputs of flip-flops 98 and 100 directly and which is applied to the $\overline{C}$ inputs of flip-flops 98 and 100 via inverters 102 and 104 respectively. The clocking of these flip-flops occurs at the trailing edge of a load instruction register (LIR) signal which is applied to inverter 108 the output of which is applied to a first input of NOR gate 106. As will be discussed below, the second input of NOR gate 106 is normally low thus permitting flip-flops 98 and 100 to be clocked at the trailing edge of the LIR signal.

The operation of the circuit shown in FIG. 4 will first be described with reference to a WAIT instruction; i.e. a logical "1" appearing at the D input of flip-flop 98. At the trailing edge of the load instruction register signal, flip-flop 98 will be clocked thus latching the WAIT instruction and producing a logical "1" at the Q output of flip-flop 98. This output is coupled to a first input of NOR gate 110 and, as a result thereof, a logical "0" appears at the output of NOR gate 110 and the D input of flip-flop 112.

The master clock oscillator 114 produces outputs 116, 118, 120 and 122 which after propagation through NAND gates 124, 126, 128 and 130 respectively and through inverters 132, 134, 136 and 138 respectively form first and second clock signals (C1 and C2), an address strobe (AS) and a data strobe (DS). Output 116 from master clock 114 is applied directly to the C input of flip-flop 112 and to the C input of flip-flop 112 via inverter 140. Therefore, after a logical "0" has been placed at the D input of flip-flop 112 in response to the latching of a WAIT instruction, the Q output of flip-flop 112 will become a logical "0" at the leading edge of the next clock pulse appearing at output 116. The Q output of flip-flop 112 is applied to inputs of NAND gates 124 and 126. Thus, when flip-flop 112 is in the zero state, NAND gates 124 and 126 do not permit passage of the signals appearing on master clock oscillator outputs 116 and 118. As a result, the outputs of inverters 132 and 134 remain a logical "0", and the processor clock pulses C1 and C2 are disabled.

The output of WAIT flip-flop 98 is also applied directly to the D input of flip-flop 142 which is clocked by the output of inverter 113. Thus, when a WAIT instruction is latched, flip-flop 142 is set at the next leading edge of the signal appearing on output 116. The $\overline{Q}$ output of flip-flop 142 is applied to inputs of NAND gates 128 and 130. Since the flip-flop 142 is now set, the $\overline{Q}$ output is a logical "0" thus inhibiting the passage of signals appearing on outputs 120 and 122 of the master clock oscillator. This produces a logical "0" at the output of inverters 136 and 138 thus disabling both the address strobe (AS) and the data strobe (DS) signals.

This is done to prevent the AS and DS lines from charging and discharging unnecessarily during the wait state.

The clock signals and address and data strobe signals will remain inhibited until either a reset signal (RST) or an interrupt signal (INT) is received. The reset signal RST is applied to a first input of NOR gate 146. The output of flip-flop 148 after inversion in inverter 150 is applied to the second input of NOR gate 146. Since flip-flop 148 is normally on, the output of inverter 150 will be a logical "0". Thus, when the reset signal (RST) goes high, a logical "0" will appear at the output of NOR gate 146. This is applied to a first input of NOR gate 152. Clock pulse C2 is applied to a second input of NOR gate 152, and since this clock signal has been disabled as a result of the WAIT instruction, a logical "0" is applied to the second input of NOR gate 152. This results in the production of a logical "1" at the output of NOR gate 152 and at the reset input of WAIT flip-flop 98. With flip-flop 98 now reset, a logical "0" is applied to the D input of flip-flop 142 and a logical "1" is applied to the D input of flip-flop 112. The next clock signal appearing on output 116 of master clock oscillator 114 will cause flip-flop 112 to set and flip-flop 142 to reset. This will enable NAND gates 124, 126, 128 and 130 resulting in the renewed production of clock signals C1 and C2, and address and data strobe signals AS and DS.

If, instead, an interrupt signal (INT), is applied to a first input of NAND gate 154. A mask interrupt signal (MASKI) is applied to inverter 156 the output of which is coupled to a second input of NAND gate 154. Thus, in the presence of an interrupt signal and in the absence of a mask interrupt signal, a logical "0" is applied to the D input of flip-flop 148. Flip-flop 148 is clocked by the output of NOR gate 158 which is applied directly to the C input of flip-flop 148 and to the C̄ input of flip-flop 148 via inverter 160. The load instruction register signal (LIR) is applied to a first input of NOR gate 158 and the output of inverter 113 is applied to the second input. Thus, with a zero appearing at the D input of flip-flop 148, the flip-flop is clocked by the next trailing edge of clock 116 resulting in a logical "0" at its Q output. This produces a logical "1" at the output of inverter 150 and a logical "0" at the output of NOR gate 146 since no reset signal is present. With logical "0's" at both inputs of NOR gate 152, a logical "1" is applied to the reset input of WAIT flip-flop 98. Clock signals C1 and C2 and address and data strobe signals AS and DS are again enabled as was described above in the case of a reset signal. It should be apparent that the primary purpose of flip-flop 148 is to synchronize the interrupt signal with the signal appearing on output 116 of the master clock oscillator 114.

When a STOP instruction is decoded, a logical one is placed at the D input of STOP flip-flop 100. This condition is latched by flip-flop 100 at the trailing edge of the load instruction register (LIR) signal as was described previously. The Q output of the STOP flip-flop 100 is applied to a first input of NAND gate 162 and a first input of NOR gate 164. Clock signal C2 is inverted in inverter 166 and applied to a second input of NAND gate 162. This synchronizes the output of NAND gate 162 with processor clock C2. When both of the Q output of STOP flip-flop 100 and the inverted processor clock C2 (i.e. C̄2) are high, a logical "1" appears at the output of inverter 168. This output is applied to a reset input of master clock oscillator 114 and to the reset input of flip-flop 112. By resetting the master clock oscillator in this manner, outputs 116, 118, 120 and 122 are totally disabled.

The logical "1" at the output of STOP flip-flop 100 is also applied to one input of cross-coupled NOR gates 164 and 170. A logical "0" will be produced at the output of NOR gate 164, and a logical "1" will be produced at the output of inverter 172. This produces a logical "0" at the D input of flip-flop 112.

If a reset signal (RST) is received, a logical "1" will appear at the output of NOR gate 152 as was described previously. This output is coupled to the reset input of STOP flip-flop 100. When flip-flop 100 becomes reset, a logical "0" will be applied to the reset input of master clock oscillator 114 thus enabling outputs 116, 118, 120 and 122. However, flip-flop 112 has not yet been set and therefore clock signals C1 and C2 remain disabled. Since output 116 has been enabled, flip-flop 142 is clocked to a reset state thus enabling AS and DS.

Flip-flop 112 becomes set as follows. When the STOP flip-flop 100 was set, a logical "1" appeared at the output of inverter 172 which was applied via line 174 to timer 176. This signal applied to timer 176 enables the timer to count clock pulses received from output 116 of master clock oscillator 114 over line 178. Thus, when the STOP flip-flop 100 is reset, timer 176 begins counting pulses received over line 178. When the counter in the timer reaches a predetermined state, an end of count (EOC) signal is applied to the input of NOR gate 170. The EOC signal is a logical "1" which causes a logical "0" to appear at the output of gate 170 which is in turn applied to an input of NOR gate 164. The output of STOP flip-flop 100 is likewise applied to an input of NOR gate 164. Since the inputs to NOR gate 164 are both zero, the output of NOR gate 164 will be a logical "1" thus producing a logical "0" at the output of inverter 172. With the zeros at both inputs of NOR gate 110, a logical "1" is applied to the D input of flip-flop 112. When the next pulse occurs on output 116 of master clock oscillator 114, flip-flop 112 is clocked producing a logical "1" at its Q output. This now enables gates 124 and 126 to pass the signals appearing on outputs 116 and 118 to produce clock pulses C1 and C2.

Timer 176 may be employed to provide a delay of for example 2 milliseconds. Such timers are well known and a further discussion at this time is not deemed necessary. For example, the timer of U.S. Pat. No. 4,222,103 entitled "Real Time Capture Registers For Data Processor" and assigned to the assignee of the present invention would be suitable.

If instead of a reset signal, an interrupt signal should occur, it is still necessary to reset flip-flop 148. However, since the master clock oscillator 114 has been disabled, no clock pulses can be applied to the C and C̄ inputs of flip-flop 148. Therefore, flip-flop 148 must be reset asynchronously. This is accomplished as follows, a logical "1" on the interrupt input is applied to a first input of NAND gate 180. Since clock signal C2 is at a logical "0", a logical "1" is applied to a second input of NAND gate 180 via inverter 182. Finally, a third input of NAND gate 182 is coupled to the output of STOP flip-flop 100 which, after execution of the STOP instruction, is at a logical "1" level. Therefore, the output of NAND gate 180 is at a logical "0" level. This output is inverted by inverter 184 and applied to the R input of flip-flop 148. After flip-flop 148 is reset, the process is the same as above described resulting in the resetting of STOP flip-flop 100.

One additional group of logic comprises NAND gates 186, 188 and 190. The first input of NAND gate 186 is coupled to the load instruction register (LIR) signal, and a second input is coupled to the output of inverter 150. A first input of NAND gate 188 is coupled to the reset signal (RST) and a second input is coupled to the output of NOR gate 110 which is a logical "0" during a WAIT or STOP condition. The outputs of NAND gates 186 and 188 are respectively coupled to first and second inputs of NAND gate 190. A third input of NAND gate 190 is coupled to the output of NOR gate 110. The purpose of the output 192 of NAND gate 190 is to load the instruction register with a hardware interrupt thus making the system ready to receive an interrupt.

What is claimed is:

1. In a digital computing system which executes software instructions in synchronization with clock signals generated by a master clock oscillator in an enabled condition thereof, a method for reducing the energy consumed by the digital system, comprising the steps of:

decoding a predetermined software instruction selected for execution by said digital computing system;

inhibiting passage of said clock signals from said master clock oscillator to said digital computing system in response to the decoding of said predetermined software instruction, and continuing to inhibit passage of said clock signals for a predetermined length of time after said master clock oscillator has been enabled;

disabling the generation of said clock signals by said master clock oscillator in response to the decoding of said predetermined software instruction; and enabling the generation of said clock signals by said master clock oscillator in response to a control signal.

2. A method according to claim 1 wherein said control signal comprises an externally produced reset signal.

3. A method according to claim 1 wherein said control signal comprises an interrupt signal.

4. In a digital computing system which executes software instructions in synchronization with clock signals generated by a master clock oscillator in an enabled condition thereof, a method for reducing the energy consumed by the digital system, comprising the steps of:

executing a predetermined software instruction selected for execution by said digital computing system;

inhibiting passage of said clock signals from said master clock oscillator to said digital computing system in response to the execution of said predetermined software instruction, and continuing to inhibit passage of said clock signals for a predetermined length of time after said master clock oscillator has been enabled;

disabling the generation of said clock signals by said master clock oscillator in response to the decoding of said predetermined software instruction; and enabling the generation of said clock signals by said master clock oscillator in response to a control signal.

5. A method according to claim 1 wherein said control signal comprises an externally produced reset signal.

6. A method according to claim 1 wherein said control signal comprises an interrupt signal.

* * * * *